United States Patent
Jan et al.

(10) Patent No.: US 10,142,228 B2
(45) Date of Patent: Nov. 27, 2018

(54) DEVICE AND METHOD FOR RETRANSMITTING DATA IN A NETWORK SWITCH

(71) Applicant: COMMISSARIAT A L'ENERGIE ATOMIQUE ET AUX ENERGIES ALTERNATIVES, Paris (FR)

(72) Inventors: Mathieu Jan, Savigny-sur-Orge (FR); Vincent David, Marcoussis (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 93 days.

(21) Appl. No.: 14/438,592

(22) PCT Filed: Oct. 16, 2013

(86) PCT No.: PCT/EP2013/071649
§ 371 (c)(1),
(2) Date: Apr. 24, 2015

(87) PCT Pub. No.: WO2014/079629
PCT Pub. Date: May 30, 2014

(65) Prior Publication Data
US 2015/0263948 A1    Sep. 17, 2015

(30) Foreign Application Priority Data

Nov. 23, 2012  (FR) ...................... 12 61152

(51) Int. Cl.
*H04L 12/891* (2013.01)
*H04L 12/863* (2013.01)
(Continued)

(52) U.S. Cl.
CPC .......... *H04L 45/74* (2013.01); *H04L 29/0653* (2013.01); *H04L 47/41* (2013.01);
(Continued)

(58) Field of Classification Search
CPC ... H04L 12/241; H04L 47/785; H04L 49/309; H04L 29/0653
See application file for complete search history.

(56) References Cited

U.S. PATENT DOCUMENTS

6,721,334 B1    4/2004  Ketcham
8,125,992 B2 *  2/2012  Makishima ............ H04L 45/04
                                                        370/389
(Continued)

*Primary Examiner* — Omer S Mian
(74) *Attorney, Agent, or Firm* — Baker & Hostetler LLP (57) ABSTRACT

A device and a method for transmitting data within a network switch is provided. The method implemented by computer makes it possible to transmit to a receiver network domain only the applicational data necessary for this domain. The method identifies in a frame received solely the data corresponding to each addressee network domain, and then the frame is disassembled so as to write each suite of data into an assigned memory area of the network switch. The method moreover makes it possible to dispatch a frame with only the data of an addressee network domain by constructing a new frame with solely the data necessary for the addressee network which have been stored in a memory area of the switch.

12 Claims, 6 Drawing Sheets

(51) Int. Cl.
*H04L 12/741* (2013.01)
*H04L 29/06* (2006.01)

(52) U.S. Cl.
CPC ............ *H04L 47/50* (2013.01); *H04L 47/621* (2013.01); *H04L 69/22* (2013.01)

(56) References Cited

U.S. PATENT DOCUMENTS

| | | | | |
|---|---|---|---|---|
| 8,891,384 B2* | 11/2014 | Dibirdi | ............... | H04L 12/4633 370/250 |
| 2001/0025321 A1* | 9/2001 | Tang | ........................ | H04L 45/00 709/246 |
| 2003/0043843 A1* | 3/2003 | Smith | ................... | H04L 12/185 370/462 |
| 2003/0103510 A1* | 6/2003 | Svanberg | ............ | H04L 12/4633 370/395.2 |
| 2005/0152359 A1 | 7/2005 | Giesberts et al. | | |
| 2006/0217936 A1* | 9/2006 | Mason | ................... | G01D 4/004 702/188 |
| 2006/0248377 A1* | 11/2006 | Tezcan | ............... | H04L 12/5695 714/4.1 |
| 2006/0256818 A1* | 11/2006 | Shvodian | ............. | H04L 1/0061 370/474 |
| 2009/0110005 A1* | 4/2009 | Horikoshi | ............ | H04J 13/004 370/479 |
| 2009/0201898 A1 | 8/2009 | Gong et al. | | |
| 2009/0268701 A1* | 10/2009 | Welborn | .............. | H04B 1/7176 370/336 |
| 2010/0074113 A1* | 3/2010 | Muramoto | .......... | H04L 43/0864 370/235 |
| 2010/0254378 A1* | 10/2010 | Akella | .................... | H04L 45/00 370/389 |
| 2010/0316052 A1* | 12/2010 | Petersen | ................. | H04L 45/00 370/392 |
| 2011/0255618 A1* | 10/2011 | Zhu | ....................... | H04W 74/08 375/260 |
| 2013/0010636 A1* | 1/2013 | Regula | .................... | H04L 49/45 370/254 |
| 2013/0024541 A1* | 1/2013 | Ziegler | .................... | H04L 47/39 709/217 |
| 2013/0070768 A1* | 3/2013 | Venkatraman | ............. | G06F 1/12 370/392 |
| 2013/0226984 A1* | 8/2013 | Sunderrajan | ............ | H04L 67/14 709/202 |
| 2014/0029617 A1* | 1/2014 | Wang | ..................... | H04L 45/38 370/392 |
| 2014/0112159 A1* | 4/2014 | Dibirdi | ............... | H04L 12/4633 370/250 |

* cited by examiner

DEVICE AND METHOD FOR RETRANSMITTING DATA IN A NETWORK SWITCH

CROSS-REFERENCE TO RELATED APPLICATIONS

This application is a National Stage of International patent application PCT/EP2013/071649, filed on Oct. 16, 2013, which claims priority to foreign French patent application No. FR 1261152, filed on Nov. 23, 2012, the disclosures of which are incorporated by reference in their entirety.

FIELD OF THE INVENTION

The invention relates to the field of data transmission in communication networks and in particular in real-time-critical distributed networks.

BACKGROUND

In real-time-critical distributed systems, the network data streams comprising a set of network frames have end-to-end constraints to be complied with between the production of the data from a sender entity and the consumption of the data by a receiver entity. During the design of such systems, these constraints must be complied with and the network resources must be dimensioned correctly with respect to the applicational needs. According to the architecture used to implement the transmission of the data streams, the dimensioning may pertain:

- to the duration of the send slots allocated to the various entities of the distributed system, when the network topology requires the deployment of arbitration of entity access to the communication network, such as for example on a data bus managed via an access policy of Time Division Multiple Access (TDMA) type; or
- to the size of the queues within the network switches when the operation of the system relies on a switched network, such as for example in the case of full-duplex switched Ethernet.

However, to design real-time-critical distributed systems which contain at least three network nodes with the existing architectures, the network resources are required to be overdimensioned, whatever the dimensioning already carried out in order to satisfy the end-to-end constraints, the overdimensioning increasing rapidly with the number of nodes. Indeed, the dimensioning of the send slots, when arbitration in relation to network access by an entity is required, relies on the assumption of a common global clock pooled between the various entities so that access to the network resources can be correctly shared. However, each entity having its own clock, the common global clock is approximated by defining an acceptable bound, called synchronization precision, for the various clocks of the entities. The more significant the precision, the smaller the uncertainties in the instants of data exchange and therefore the better is the use of the bandwidth. As the number of entities grows, the precision decreases and the utilization of the bandwidth decreases, hence requiring the overdimensioning of the network capabilities. In the case of the dimensioning of the queues of network switches, there is a very large number of possible states of these queues of the various switches of the network while satisfying compliance with the end-to-end constraints for the applicational data streams as a whole. The solution in relation to the required size of these queues is either greatly pessimistic, hence requiring significant overdimensioning of the resources, or else may be exact but on relatively small sizes of system. Thus, the capabilities of a communication network that are required for the execution of critical real-time distributed systems must be overdimensioned, thus increasing the cost of implementing such systems.

Moreover, independently of the retransmission policy used within a switch, whether it be in direct or deferred mode for example, current switches do not consider the applicational content of the network frames. Thus, the applicational part of a network frame is viewed as a black box whose content is completely retransmitted on a set of ports of the network switch, as a function of the fact that it is a frame of unicast, multicast or broadcast type. However, the entire applicational content of a frame might not be relevant to the whole set of addressee entities of a frame of multicast or broadcast type. For example, it is possible that the addressees of network frames within a network domain such as a set of entities bus-connected on a port of the switch may use only a part of the applicational content of the frames received by the switch. Moreover, each part of the applicational content of a network frame necessary for an entity may be different from one entity to the next. It is also possible that part of the applicational content of a frame may not be used by any of the addressee entities of a network domain, but on the contrary by addressee entities of another network domain, thereby justifying in the current solutions the inclusion of data which is unnecessary in respect of a network domain, this frame part then occupying network bandwidth unnecessarily. Consequently, the actual effectiveness of the network transmission, which is the ratio of the quantity of applicational data transmitted to the size of the frame, is therefore reduced. Moreover, the latency in dispatching such a frame is increased in a likewise unnecessary manner, this being particularly accentuated if the sum of the data actually necessary for the network domain constructed is reduced.

Currently, to ensure the fact that the data present in a frame are completely necessary for a network domain, a set of network frames must be constructed, each containing solely the data required by the network domain considered. This requires that the number of frames sent be increased and consequently that their size be decreased and also that the number of preambles and postambles of the frames be increased. Likewise, the minimum number of periods of inactivity between two frames, said periods being called "interframe gap", is also increased. For all these reasons, the use of the network bandwidth is therefore decreased.

Thus, the current procedures for retransmission of data by a network switch entail under-use of the capabilities of the networks connected to the switches.

There thus exists the need for a solution which makes it possible at one and the same time to satisfy compliance with end-to-end constraints for the dissemination of data while best utilizing the capabilities of a distributed real-time network.

The present invention deals with this need.

SUMMARY OF THE INVENTION

An object of the present invention is to provide a method making it possible to guarantee that only the data required by a network domain of a network switch travel over this same network domain.

The present invention makes it possible to satisfy compliance with the end-to-end temporal constraints associated with the data and to best utilize the capabilities of the network.

Advantageously, the invention allows the retransmission of network frames via disassembly of the frames received and reassembly of the applicational data within new network frames by relying on the knowledge (acquired in a static or dynamic manner) of the structuring of the applicational load of the frames and the needs (acquired in a static manner) in terms of consumption by each of the network domains connected to a network switch.

Advantageously, the invention makes it possible to increase the network bitrate attained. Thus for applicational data arising from potentially different network domains, optionally received at different instants, these data can be used to form new frames.

Advantageously, the invention makes it possible to construct packets of a size capable of best utilizing the capabilities of the network while ensuring the fact that the data present in a frame are completely necessary for a network domain.

Advantageously, successive sendings of network frames of small size can be replaced with the sending of frames of more significant size allowing optimum effectiveness at the applicational level of the transmission thus obtained.

Another object of the present invention is to be able to easily add entities over a network domain. The recovery of the values of the data necessary for the added entity is done solely by dispatching a request to the network switch and not as in the existing solutions by dispatching requests to the entirety of the entities with which the added entity communicates.

Still advantageously but without limitation, the invention will find applications in industrial fields requiring the solving of complex and parallel calculations, for example of numerical simulation in structural mechanics. In particular, the present invention finds advantage for applications of this type executing on a grid of calculations, that is to say clusters of machines interconnected by high-performance networks linked by switches.

To obtain the results sought, a method, a system and a computer program product are proposed.

In particular, in a communication network comprising a plurality of network domains interconnected by switches, a method implemented by computer to transmit data from a sender network domain to at least one receiver network domain, comprises the steps of:
  receiving on a network switch at least one incoming frame of data of a sender network domain;
  identifying in the at least one frame received the data corresponding to one or more addressee network domains;
  writing each of said data identified in an assigned memory area of the network switch;
  constructing at least one outgoing frame of data for each addressee network domain, said at least one outgoing frame comprising solely data identified for said addressee network domain; and
  dispatching said at least one outgoing frame of data to said addressee network domain.

In a preferential implementation, the method makes it possible to receive an incoming frame on at least one receiver port of the network switch and to dispatch the outgoing frames on one or more sender ports of the network switch.

In one embodiment, the step of identifying the data consists in analyzing the structure of the incoming frame and determining the fields corresponding to the data.

Advantageously, the fields of the data can be of predefined lengths or be identified by a unique identifier.

In another embodiment, the method makes it possible to transfer the identified data from one or more direct memory access (DMA) controllers to each assigned memory area of the switch.

In another embodiment, the method makes it possible to transfer each of the written data to one or more direct memory access controllers.

In another embodiment, the step of constructing an outgoing frame consists in creating a frame header and adding the whole or a part of the data stored in the memory area assigned to the corresponding network domain.

In another embodiment, the method makes it possible to receive a request for dispatching data by an entity of an addressee network domain before dispatching the corresponding outgoing frame.

In a variant, the step of dispatching the outgoing frames is effected at precalculated instants.

Advantageously, the method allows that the steps of constructing the outgoing frame and of dispatching be asynchronous with the steps of reception, identification and writing.

Advantageously, the method makes it possible to process incoming frames which may be frames of "multicast" or "broadcast" type.

Advantageously, the method can be effected in a communication network by a system comprising means for implementing all the steps of the method.

Advantageously, this system is a network switch.

Advantageously, the method can be implemented by computer and available in the form of a computer program product comprising code instructions making it possible to perform all the steps of the method, when said program is executed on a computer.

BRIEF DESCRIPTION OF THE DRAWINGS

Various aspects and advantages of the invention will appear in support of the description of a preferred but nonlimiting mode of implementation of the invention, with reference to the figures hereinbelow.

DETAILED DESCRIPTION

Figure 1:
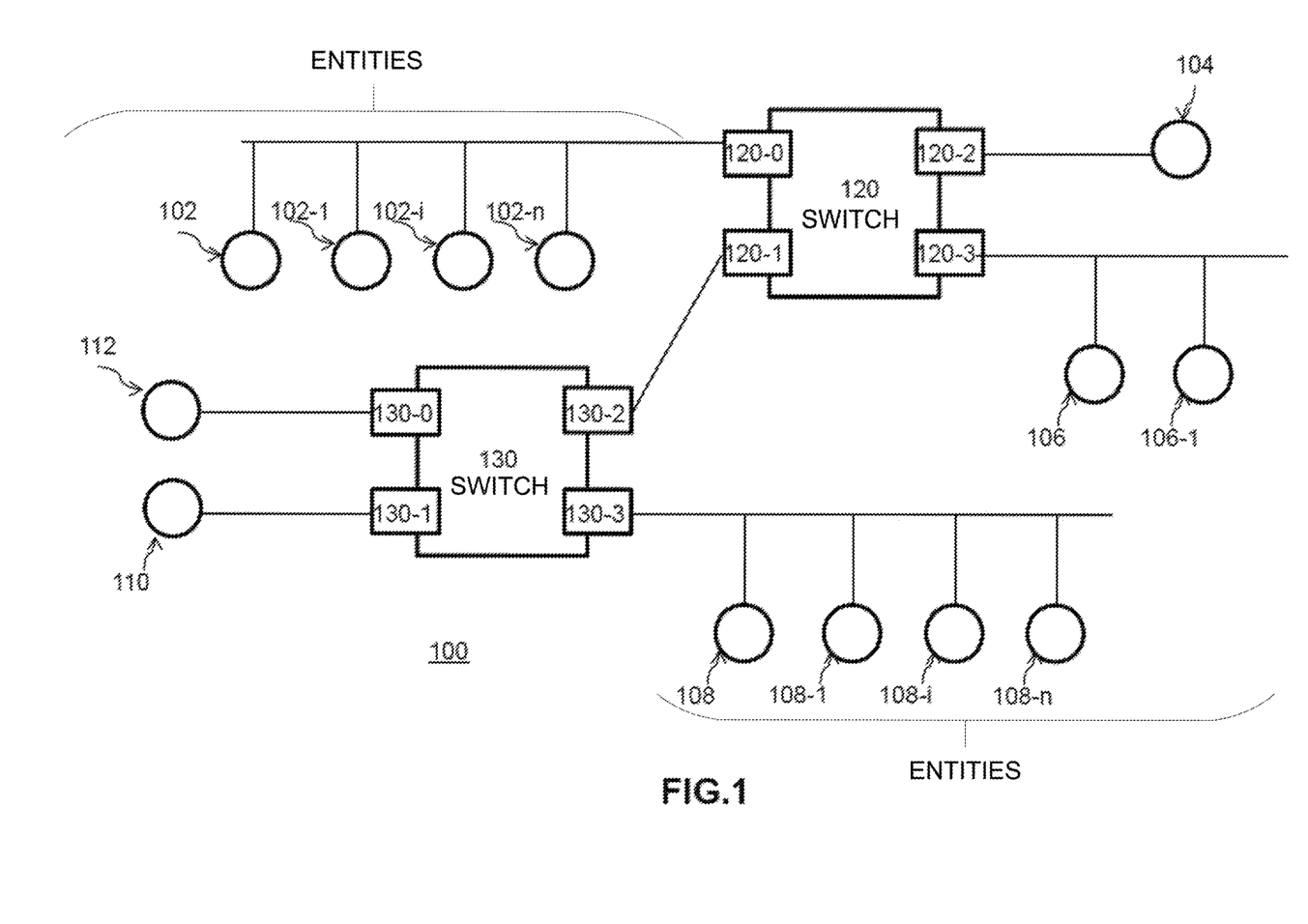
FIG. 1 is a topological representation of a network infrastructure in which to advantageously implement the invention.

The invention applies advantageously in a critical distributed real-time network (100) such as shown schematically in FIG. 1.

The network (100) comprises a plurality of entities (102, 104, 106, 108, 110, 112) interconnected by switches (120, 130). For reasons of simplicity of description and not of limitation of the invention, the example of FIG. 1 shows only a finite number of entities and of switches, but the person skilled in the art will apply the principles described in respect of the present invention to an ex-tended network comprising a plurality of nodes, of switches and various types of entities. An entity may be any type of computer or other unit consisting of a calculation processor, such as a microcontroller for example, and having one or more network interfaces, such as an interface of Ethernet type for example.

Certain entities (102-$i$) may be interconnected via network strands which may be buses, other entities (104, 110, 112) may be connected directly to a switch (120, 130). However, other network topologies support the principles of the present invention, such as for example switches linked together directly (120-1, 130-2).

The network switches (120, 130) comprise network ports (120-0, 120-1, 120-2, 120-3) and (130-0, 130-1, 130-2, 130-3). Each switch can be equipped with a different number of network ports, the example shown in FIG. 1 being only for aspects of simplification and not of limitation. The network ports can be receiver and/or sender ports making it possible to connect network strands so as to communicate with the entities.

An item of application ware apportioned over a distributed real-time network such as that of FIG. 1 can have data produced by a sender entity (102) belonging to a producer network domain, and which has to be forwarded to one or more receiver entities (106-1, 108-$n$, 110) which may belong to one or more consumer network domains. By applying the principles of the invention, such as we shall describe them in greater detail, the satisfaction of the fact that the actual deadlines for forwarding the data, denoted $\Delta t_{actual}$, are below the requirements of end-to-end constraint between the production of the data and their consumption (denoted $\Delta t_{spec}$) can be achieved.

Nonlimiting examples of application ware benefiting from the principles of the invention are, for example, onboard electronic entities embedded within an airplane to ensure automatic piloting or navigation, or else onboard electronic entities embedded within a vehicle (train or automobile) to ensure the management of injection or braking assistance for example.

Figure 2:
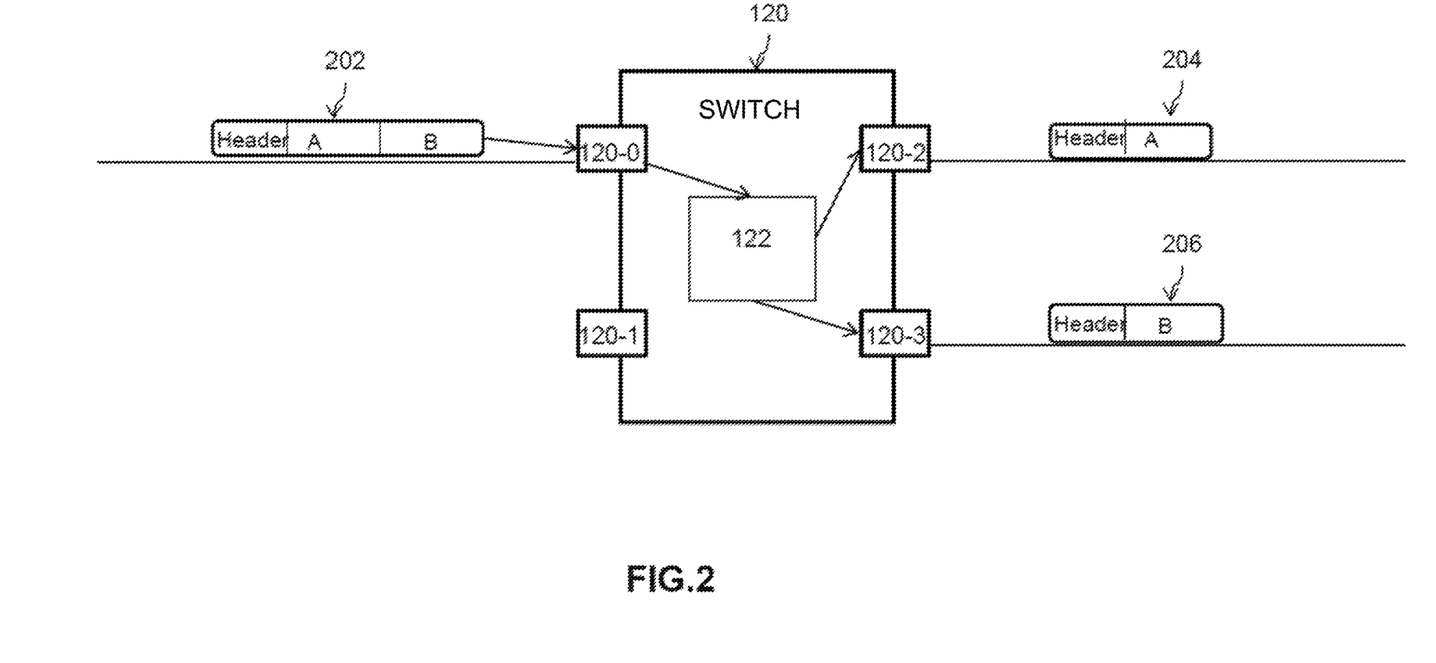
FIG. 2 is a simplified diagram of the retransmission of an item of data within a network switch according to the procedure of the present invention.

FIG. 2 shows, on a simplified diagram, an example of retransmission of data within a network switch according to the procedure of the present invention.

A network frame (202) originating from a producer network domain contains a header and data A and B. The frame is received on a receiver port (120-0) of the network switch (120). The item of data A is consumed solely by a consumer network domain connected to a sender port (120-2) of the network switch. The item of data B is consumed solely by a consumer network domain connected to another sender port (120-3) of the same network switch. According to the principles of the invention, the data (A, B) will be extracted from the network frame received (202) so as to be stored independently within a memory of the network switch. A new frame (204) containing a header and solely the item of data A will be constructed so that it is sent by the sender port (120-2) coupled to the consumer network domain consuming the item of data A. In a similar manner, another frame (206) containing a header and solely the item of data B will be constructed so that it is sent by the sender port (120-3) coupled to the consumer network domain consuming the item of data B. The new frames (204, 206) are generated on the basis of the values of the data A and B stored in the central memory of the switch.

The data stored in the central memory of the switch are identified in a unique manner. An identifier for the data may for example be a number. In a first variant where it is possible to have a static knowledge of the frames received and of their structure such as the offset and the lengths of the data in each of the frames, it is not necessary to include additional identifiers of data in the format of the frames.

In a second variant, the frames received include an identifier dedicated to each item of data so as to make it possible to identify them in the frame. The switch uses each identifier to construct the transfers from the reception port to the central memory.

Figure 3:
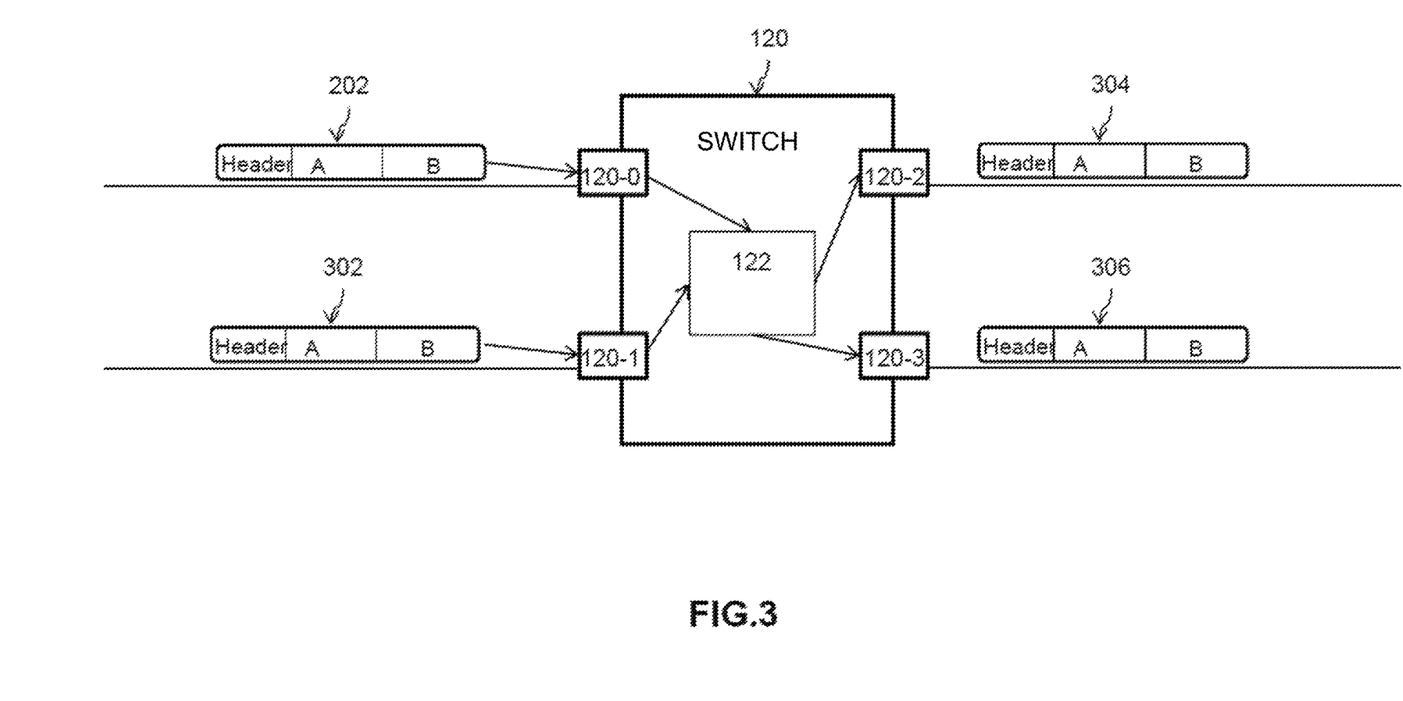
FIG. 3 illustrates a grouping of data from network frames originating from different network domains according to the procedure of the present invention.

FIG. 3 illustrates an example of grouping of data by consumer network domain according to the procedure of the present invention for network frames originating from different producer network domains. A network switch (120) receives on a first port (120-0) a first network frame (202) originating from a producer network domain and a second network frame (302) on a second port (120-1). The first frame contains a header and data A and B. The second frame contains a header and data C and D. The data A and C are consumed by one and the same consumer network domain connected to a sender port (120-2) of the network switch. The data B and D are consumed by one and the same consumer network domain connected to another sender port (120-3) of the same network switch.

As described for the example of FIG. 2, according to the principles of the invention, the data (A, B, C, D) will be extracted from each network frame so as to be stored independently within a memory of the network switch. Two new frames will be generated (304, 306) containing a header and respectively the appropriate data (A, C) and (B, D) so as to be sent from the sender port corresponding to the network domain concerned.

The person skilled in the art will appreciate that only two examples have been chosen to illustrate the principles of the invention, but that they apply in constructing frames of any type on the basis of one or more received frames.

In an advantageous manner, in a variant, the method of the invention allows the switch to wait to have a certain number of data necessary for a network domain before constructing the required network frames which will be sent to the addressee network domain. This wait may also be as a function of the time delta calculated a priori before the execution of a real-time distributed system, while complying with the end-to-end temporal constraints which would be specified for the set of the streams concerned.

Thus, this capability makes it possible to optimize the use of the bandwidth via the packetizing in one and the same frame of data having close resending instants, and therefore to avoid the construction and the sending of several frames of smaller sizes.

Still advantageously, the present invention easily allows the addition of new entities into a distributed system since the data necessary for a new entity can be available directly on the network switch without involving modifications of the other entities.

A distributed system can also be designed to operate according to the principles of the invention where the switch receives requests for calls for data that it must honor, the various entities connected to the switch not in this case needing to know either the sender or the location of the producers of the data. Capture of the internal state of the system traveling through the network is also possible by consulting the values of the data available at the level of the network switch. This may for example facilitate the defining of backup states for saving a system with a view to its restoration if an error were to occur subsequently.

In an optional manner, the method of the invention can be applied solely to a subset of the network frames traveling through a data network switch by using a field for identifying the type of frame in the header of the protocol used at the link level of the OSI networking open systems interconnection model. An example is to use the "type of protocol" field of the header of an Ethernet frame. Thus, one and the same network switch can process frames according to an already known retransmission method and moreover process frames with the network domain based allocation according to the principles of the invention.

Figure 4:
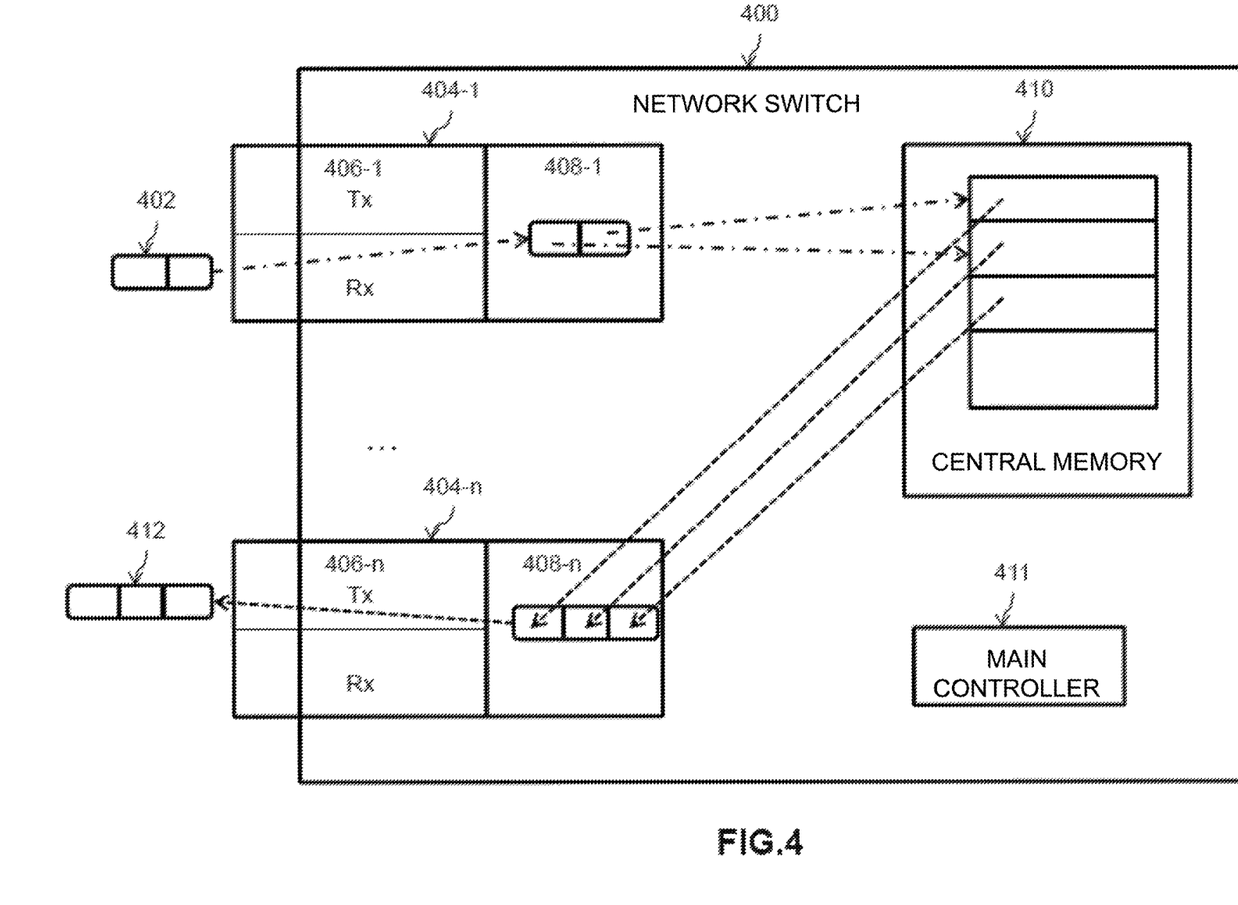
FIG. 4 schematically shows the architecture of a network switch in a preferential implementation of the invention.

FIG. 4 schematically shows the architecture of a network switch in a preferential implementation of the invention. A network switch (400) consists of "n" sender/receiver ports (404-1 to 404-n). Each port comprises a network controller (406-1 to 406-n). The network switch comprises moreover a central memory (410) and a main controller (411). Each network controller has its own capability for transmitting network frames (denoted Tx in the figure), and its own capability for receiving network frames (denoted Rx in the figure). Each network controller is moreover coupled to a direct memory access (DMA) controller (408-1 to 408-n). The DMA controller is in charge of undertaking the transfers of data from and to the central memory of the switch and the network controller, under the control of the processor (411).

The person skilled in the art will understand that the architecture described is schematic in order to illustrate the method of the invention but is in no way limiting of its implementation. In particular, the implementation is dependent on the capabilities of the DMA controller associated with the network controller. Thus, in implementation variants, a DMA controller may offer a capability to disperse or assemble data described in chained DMA requests. In another variant, to alleviate the absence of the latter functionality on the DMA controller associated with the network controller, an extra DMA controller can be coupled to the existing controller.

The central memory (410) stores the data which travel via the network switch. The structure of the received frames (402) is analyzed at the data link level, so that the stored data are distributed in the central memory of the switch, via DMA transfers (408-1) between the network controllers (406-1) and the central memory under the responsibility of the main controller (411). Alternatively, this analysis of the frames received can be done at higher levels of the data link level in an implementation variant within a router for example.

On the basis of the data present in the central memory, the frames will be constructed by the main controller, via the DMA controllers (408-n) so as to be sent (412) by the network controllers (406-n).

In variants of implementation of the central memory, advantageously the present invention makes it possible to differentiate several data values, by associating for example a desired date of making available to consumers, without however requiring the synchronization of the various time bases used by the network strands.

Still advantageously, in order to manage competing accesses to an item of data, a buffer for storing the set of pairs (value of the item of data, date of making available) of an item of data can be defined.

Advantageously, the central memory can be organized into "n" memory blocks, "n" being equal to the number of network controllers. Each memory block is preferably contiguous in memory so as to define a single memory region. Upon the reception of a network frame by a network controller, the memory accesses on the memory region dedicated to this controller are write-accesses, the accesses on the other memory blocks being blocked so as to prohibit reading or writing operations. During the sending of a network frame, the memory accesses on all the memory blocks of the switch are set to read-only access. Thus, only a producer network domain producing an item of data is authorized to modify it, securing the data exchanged by the switch.

Figure 5:
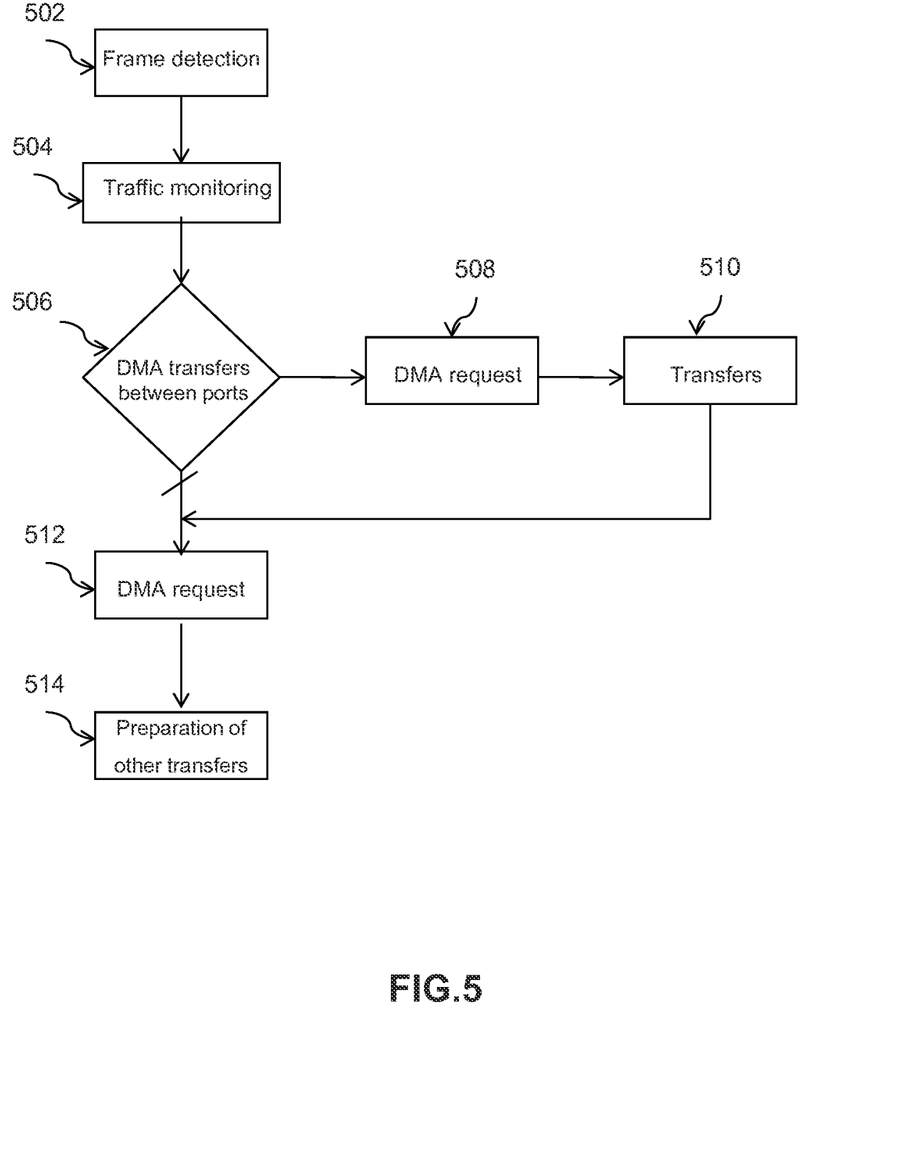
FIG. 5 shows a chain of the steps effected during the reception of a frame by a network switch.

FIG. 5 shows the chain of the steps effected during the reception of a frame by a network switch.

The reception of a network frame is detected (502) by the switch at the level of the reception capability (Rx) of the network controller. This detection is done for example via the generation of an interrupt at the processor or following the consultation by the processor of the state of a register of the network controller. The main controller (411) identifies by which retransmission method the frame received must be processed, by the method of retransmission of the present invention or by an alternative method. The identification of the method to be selected can preferably be implemented by setting a particular value in the "type of protocol" field of an Ethernet frame, if for example the underlying network uses the Ethernet protocol at the link level of the OSI model.

In an optional step (504), monitoring of the network traffic received can be deployed. For example, a static knowledge of the network frames to be received on a port may be used to verify that the frame received has been sent by the proper entity, in a calculated time interval and with a correct applicational structure.

At the following step (506), the method tests whether a part of the data of a received frame must be copied over to other network ports of the switch having to send frames containing these data. If yes, DMA requests of "peripheral to peripheral" type are generated (508) to carry out the corresponding transfers (510). If no, the method continues at step 512.

Advantageously, these requests make it possible to accelerate the retransmission of the data thus transferred if the temporal constraints applied to these data are not compatible with a transfer of the latter by the central memory of the switch. The deadline remaining with respect to a making available to consumers can be used to decide whether or not to use this optional step of the method.

At the following step (512), the DMA requests required for the extraction of the applicational data present in the network frame received and the storage within the central memory of the switch are prepared by the main controller (411). The DMA transfers are triggered by the main controller. In the cases of implementation where it is possible to have a static temporal knowledge of the frames to be received and of their structure (offsets and lengths of the data in each of the frames), the preparation of the DMA requests can be carried out before the reception of the frame. An example is for the case of the management of the network accesses by the entities connected to a port, carried out by the time division multiple access (TDMA) technique.

In another variant, in order to identify the data of a frame, the applicational load of the frame is structured as a pair string (fixed-size data headers identifying the item of data and indicating the size of an item of data, corresponding item of data). The analysis of these data headers makes it possible to construct the required DMA requests. The DMA controller notifies the main controller of the end of the data transfers between the network controller and the central memory of the switch. The DMA requests can be reused to describe other calls for data transfers. As a function of the number of data items to be transferred and of the number of available DMA requests, this step can be repeated to completely process a network frame received.

In a following step (514), the DMA requests available and released can be used to describe the next transfers of data to be carried out upon the reception of the next network frame. This step of the method is present only if the chosen implementation of the method makes it possible to have a static knowledge of the network frames that will be received.

The person skilled in the art will understand that various implementations are possible to establish the DMA requests which are dependent on the capabilities of the DMA controller of the network controller. For example, if a DMA controller does not offer any capability to disperse a network frame to various sites via a chained list of DMA requests, the DMA controller of the network controller is used by the main controller to copy the frame in an intermediate memory area in the central memory of the switch. At the end of this DMA transfer, the identification of the data will be carried out by the main controller as will the construction of the set of DMA transfers required in order to disperse the data in the central memory of the switch by another DMA controller. If the DMA controller offers a capability of the type disperse/assemble (also referred to as "scatter/gather") a memory area, the latter can be used directly by the main controller to store the data in the central memory of the switch. The strategy for arbitrating between the various DMA requests of the various DMA controllers makes it possible to characterize the temporal behavior of the exchanges so as to control their impact on the satisfaction of the end-to-end constraints associated with the data.

Figure 6:
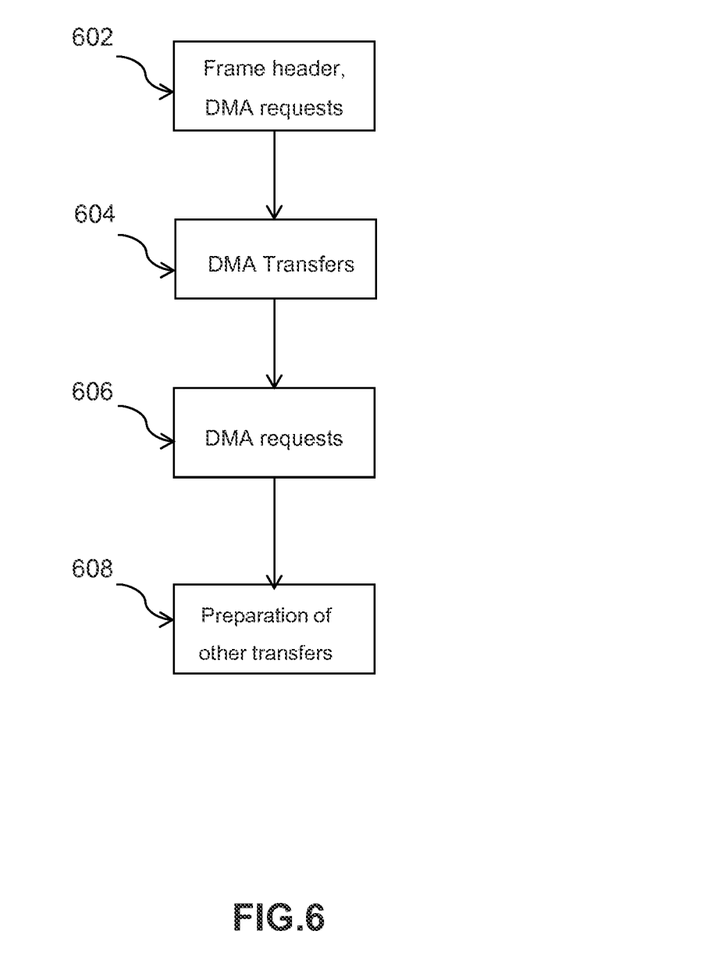
FIG. 6 shows a chain of the steps effected during the sending of a frame by a network switch.

FIG. 6 shows the various steps effected for the sending of a network frame. In a first step (602), the header of the frame to be sent is constructed by the main controller, as is the set of DMA requests required in order to carry out the transfers of data from the central memory of the main controller to the network controller of the switch having to send the frame.

If the implementation solution chosen makes it possible to have a static knowledge of frames to be sent and of their structure (offsets and lengths of the data in each of the frames), this step can be a prior step carried out before sending the frame.

At the following step (604), the main controller initiates the DMA transfer or transfers prepared either at the previous step (602) or beforehand. The data to be included in the network frame are transferred from the central memory of the switch to the network controller in charge of sending so as to fill the applicational part of the network frame.

The DMA controller of the network controller notifies the main controller of the end of the transfers of data between the central memory of the switch and the network controller. The DMA requests can be reused to describe other calls for data transfers. As a function of the number of data items to be transferred and of the number of available DMA requests, this step can be repeated so as to completely construct a network frame to be sent. Various implementations are possible which are dependent on the capabilities of the DMA controller of the network controller.

At the following step (606), when the end of the DMA transfers is detected by the DMA controller, the network controller is asked to send the frame. Optionally and in a similar manner to the reception phase, monitoring of the network traffic sent can be deployed.

In a following step (608), the DMA requests available and released at the previous step can be used to describe the next transfers of data to be carried out during the reception of the next network frame. This step of the method is present solely if the chosen implementation of the method makes it possible to have a static knowledge of the network frames that will be sent.

FIGS. 5 and 6 describe steps of the method for the reception and the sending of a network frame. In a variant, the method can choose to wait to receive a certain number of network frames before triggering the steps of the method in reception.

It should be noted that the method described is independent of the type of onboard network controller imbedded in the network switch, which may for example be an Ethernet controller, a CAN (Controller Area Network) controller or a FlexRay™ controller. Moreover, it is possible to have various type of network controller in one and the same network switch, the storage of the data in the central memory of the switch being carried out in a manner independent of the data link layer used. Thus, the present method is compatible with the gateway notion in a distributed architecture in which the data traveling via a data protocol are retransmitted via another protocol. Finally, error processing steps may optionally be required. However, the actions to be executed when an error has been identified which are related to the implementation of the method are not described.

The present invention can be implemented on the basis of hardware and/or software elements. It can be available as a computer program product on a computer readable medium. The medium can be electronic, magnetic, optical, electromagnetic or be a dissemination medium of infrared type. Such media are for example, semi-conductor memories (Random Access Memory RAM, Read-Only Memory ROM), tapes, magnetic or optical diskettes or disks (Compact Disk—Read Only Memory (CD-ROM), Compact Disk—Read/Write (CD-R/W) and DVD).

Thus the present description illustrates a preferential implementation of the invention, but is not limiting. An example has been chosen to allow a proper understanding of the principles of the invention, and a concrete application, but it is in no way exhaustive and should allow the person skilled in the art to under-take modifications and variants of implementation while preserving the same principles.

The invention claimed is:

1. In a communication network comprising a plurality of network domains, a method implemented by computer within a network switch for transmitting frames of data from a sender network domain to at least one receiver network domain, the network switch comprising at least a central memory, network receiver ports, and network sender ports, the method comprising the steps:

receiving on a network receiver port at least one incoming frame of data from a sender network domain, the incoming frame containing a header and applicational content;

identifying within the applicational content of the at least one incoming frame, each independent part corresponding to a different addressee network domain;

disassembling the applicational content to extract an item of data of each said independent part of the applicational content from the at least one incoming frame;

writing each said extracted item of data in a different memory area of the central memory of the network switch, the central memory having different memory areas assigned to the different addressee network domains;

waiting a respective time period, calculated a priori before said receiving of the at least one incoming frame of data, to allow accumulation of a certain number of data necessary for each respective addressee network domain, the time period being calculated to comply with end-to-end temporal constraints;

constructing an outgoing frame for each different addressee network domain after waiting the respective time period, wherein each of said outgoing frames comprising a header and an applicational content made of one or more item of data corresponding to the same addressee network domain, the one or more item of data for each applicational content being transferred from a same memory area of the central memory; and dispatching each of said outgoing frames of data to a network sender port assigned to a respective addressee network domain by triggering a direct access memory request by direct memory controllers coupled to each respective network sender port.

2. The method as claimed in claim 1, wherein the step of identifying within the applicational content each independent part, consists in analyzing the structure of the applicational content of the at least one incoming frame and determining fields corresponding to each independent part.

3. The method as claimed in claim 2, wherein the field of each independent part of the applicational content is are of predefined lengths.

4. The method as claimed in claim 2, wherein the field of each independent part of the applicational content is identified by a unique identifier.

5. The method as claimed in claim 1, wherein the step of writing each said independent item of data in a different memory area of the central memory comprises triggering direct memory access requests by a direct memory access (DMA) controller coupled to the network receiver port.

6. The method as claimed in claim 1, further comprising, before the step of constructing an outgoing frame, a step of transferring all or part of the independent item of data stored in a same memory area of the central memory to a direct memory access controller.

7. The method as claimed in claim 1, wherein the step of dispatching said outgoing frames is effected at precalculated instants.

8. The method as claimed in claim 1, wherein the steps of constructing the outgoing frames and of dispatching are asynchronous with the steps of receiving, identifying, extracting, and writing.

9. The method as claimed in claim 1, wherein said at least one incoming frame is a frame according to the so-called "multicast" or "broadcast" type.

10. In a communication network comprising a plurality of network domains, a system for transmitting data from a sender network domain to at least one receiver network domain, the system comprising means for implementing the steps of the method as claimed in claim 1.

11. A network switch, comprising the system as claimed in claim 10.

12. A non-transitory computer program product, said non-transitory computer program comprising code instructions to perform in a network switch of a communication network comprising a plurality of network domains, when said program is executed on a computer, transmitting frames of data from a sender network domain to at least one receiver network domain, the network switch comprising at least a central memory, network receiver ports, and network sender ports, said code instructions comprising:

instructions for receiving on a network receiver port at least one incoming frame of data from a sender network domain, the incoming frame containing a header and applicational content;

instructions for identifying within the applicational content of the at least one incoming frame, each independent part corresponding to different addressee network domains;

instructions for extracting an item of data of each said independent part of the applicational content from the at least one incoming frame;

instructions for writing each said extracted item of data in a different memory area of the central memory of the network switch, the central memory having different memory areas assigned to the different addressee network domains;

instructions for waiting a respective time period, calculated a priori before said receiving of the at least one incoming frame of data, to allow accumulation of a certain number of data necessary for each respective addressee network domain, the time period being calculated to comply with end-to-end temporal constraints;

instructions for constructing an outgoing frame for each different addressee network domain after waiting the respective time period, wherein each of said outgoing frames comprising a header and an applicational content made of one or more item of data corresponding to the same addressee network domain, the one or more item of data for each applicational content being transferred from a same memory area of the central memory; and instructions for dispatching each of said outgoing frames of data to a network sender port assigned to a respective addressee network domain by triggering a direct access memory request by direct memory controllers coupled to each respective network sender port.

* * * * *